United States Patent
Ceglarek et al.

(10) Patent No.: US 11,794,615 B2
(45) Date of Patent: Oct. 24, 2023

(54) MOTOR VEHICLE SEAT AND MOTOR VEHICLE SEAT SYSTEM

(71) Applicant: Faurecia Autositze GmbH, Hannover (DE)

(72) Inventors: Piotr Ceglarek, Katowice (PL); Slawomir Filip, Grabianów (PL); Tomasz Stasinski, Dzierzoniow (PL); Jérémie Therry, Wroclaw (PL)

(73) Assignee: Faurecia Autositze GmbH, Hannover (DE)

( * ) Notice: Subject to any disclaimer, the term of this patent is extended or adjusted under 35 U.S.C. 154(b) by 0 days.

(21) Appl. No.: 17/739,313

(22) Filed: May 9, 2022

(65) Prior Publication Data

US 2022/0371480 A1   Nov. 24, 2022

(30) Foreign Application Priority Data

May 20, 2021  (DE) .......................... 102021113073.5

(51) Int. Cl.
*B60N 2/90* (2018.01)
*B60N 2/22* (2006.01)

(52) U.S. Cl.
CPC ................. *B60N 2/22* (2013.01); *B60N 2/99* (2018.02)

(58) Field of Classification Search
CPC ...................................................... B60N 2/99
See application file for complete search history.

(56) References Cited

U.S. PATENT DOCUMENTS

| 2010/0117412 A1* | 5/2010 | Bicker | B60N 2/99 |
| | | | 297/284.6 |
| 2021/0245643 A1* | 8/2021 | Ceglarek | B60N 2/914 |
| 2021/0323456 A1* | 10/2021 | Ceglarek | B60N 2/99 |
| 2022/0024366 A1* | 1/2022 | Therry | B60N 2/914 |

FOREIGN PATENT DOCUMENTS

| DE | 202018106581 U1 * | 11/2019 | |
| DE | 102019114089 A1 * | 12/2020 | B60N 2/914 |
| DE | 102020215210 A1 * | 6/2022 | |
| DE | 102021202474 A1 * | 9/2022 | |

* cited by examiner

*Primary Examiner* — Timothy J Brindley
(74) *Attorney, Agent, or Firm* — Laurence P. Colton; SMITH TEMPEL BLAHA LLC

(57) ABSTRACT

A motor vehicle seat having a backrest and a seat part and an adjustable sidewall arranged on the backrest and/or the seat part, which sidewall comprises an adjustment mechanism having a stationary portion and a lever portion pivotable about a pivot axis, and having at least one fluid-fillable bladder arranged between the stationary portion and the lever portion for adjusting the relative angular position thereof, wherein the lever portion comprises two wing portions which are arranged on either side of the pivot axis, and the bladder is arranged between a first wing portion and the stationary portion, wherein a preload torsion spring engages by a first spring portion on the stationary portion, and engages by a second spring portion on the second wing portion, of the lever portion, such that it exerts a preload force which pushes the first spring portion in the direction of the stationary portion.

6 Claims, 2 Drawing Sheets

MOTOR VEHICLE SEAT AND MOTOR VEHICLE SEAT SYSTEM

CROSS REFERENCE TO RELATED APPLICATIONS

This patent application claims priority on and the benefit of German patent application Ser. No. 10 2021 113 073.5 having a filing date of 20 May 2021.

BACKGROUND OF THE INVENTION

Technical Field

The invention relates to a motor vehicle seat and a motor vehicle seat system.

Prior Art

In the field of motor vehicle seats, it is known to actively adjust sidewalls of the seat part or back rest. For example, the active adjustment of such sidewalls serves to provide additional support in the case of cornering, during which the centrifugal force acts on the vehicle occupants. In this case, it is known to adjust sidewalls accordingly, in order to provide the vehicle occupants with additional side support against the centrifugal force direction.

It is also known that, in order to adjust sidewalls, fluid-fillable bladders are used, which actuate a lever which then changes the angular position of the sidewalls. Fluids, in this connection, may be a liquid or a gas; air is preferably used. An effective active support by the sidewalls requires the system to be able to react as quickly as possible, in order that the support by the sidewalls is ensured, when it is required. Significant delays call into question the effectiveness of the active support by the sidewalls. In the case of the fluid-fillable bladders, care should be taken to ensure that the bladders, which are used for adjusting the sidewalls can be filled and/or emptied sufficiently quickly. For this purpose, pneumatic systems are generally required, which have a particularly high delivery rate. This is expensive, and therefore also associated with significant outlay for apparatus.

BRIEF SUMMARY OF THE INVENTION

The object of the present invention is that of specifying a motor vehicle seat and a motor vehicle seat system, in the case of which it is possible to ensure, by relatively cost-saving means, that the described active support of the sidewalls, by means of a fluid-fillable bladder, can also dispense with powerful pump devices.

This object is achieved by a motor vehicle seat comprising a backrest and a seat part, wherein at least one adjustable sidewall is arranged on the backrest and/or the seat part, which sidewall comprises an adjustment mechanism having a stationary portion and a lever portion which is connected thereto and is pivotable about a pivot axis, and having at least one fluid-fillable bladder which is arranged between the stationary portion and the lever portion for the purpose of adjusting the relative angular position thereof, wherein the lever portion comprises two wing portions which are arranged on either side of the pivot axis, and the bladder is arranged between a first wing portion and the stationary portion, wherein a preload spring, in the form of a torsion spring, engages by a first spring portion on the stationary portion, and engages by a second spring portion on the second wing portion, of the lever portion, such that it exerts a preload force which pushes the first spring portion in the direction of the stationary portion, and a motor vehicle seat system comprising a motor vehicle seat as taught above, at least one valve means designed for filling or emptying the bladder, and a controller which generates a control signal in order to bring about the opening or closing of the valve means, wherein the lever portion can be moved along a pivot path, by generating the control signal, and consequently by filling or emptying the bladder. Advantageous embodiments can be found in the dependent claims.

The motor vehicle seat according to the invention comprises a backrest and a seat part, at least one adjustable sidewall being arranged on the backrest and/or the seat part. The at least one sidewall is actively adjustable and comprises, for this purpose, an adjustment mechanism having a stationary portion and a lever portion that is connected thereto and is pivotable about a pivot axis, and at least one fluid-fillable bladder. The fluid-fillable bladder—air is preferably used as the fluid—serves for actuating the adjustment of the sidewall, and is arranged, for this purpose, between the stationary portion and the lever portion. As a result, the relative angular position between the stationary portion and the lever portion can be changed.

The lever portion comprises, according to the invention, two wing portions which are arranged on either side of the pivot axis, the at least one fluid-fillable bladder being arranged between the first wing portion and the stationary portion. According to the invention, it is furthermore provided for a preload spring, in the form of a torsion spring, engage by a first spring portion on the stationary portion, and by a second spring portion on the second wing portion, of the lever portion. In this case, the spring portions of the torsion spring engage such that said spring exerts a preload force which pushes the first wing portion in the direction of the stationary portion. As a result, in any angular position between a first end position and a second end position of the adjustment mechanism, a preload force always acts between the lever portion on the one hand and the stationary portion, preferably fastened to a part of the seat structure of the motor vehicle seat, on the other hand. The torsion spring is preferably designed as a leg spring. In this case, the first spring portion is a first spring leg, and the second spring portion is a second spring leg. According thereto, the preload exists even in the event of complete evacuation of the fluid-fillable bladder, between the mentioned portions. As a result, the preload force between the stated portions increases with successive filling of the bladder. In particular it may be possible, according to an advantageous embodiment, for the second spring portion to be supported on the second wing portion of the lever portion, on the side facing the stationary pivot portion. The torsion spring is preferably designed such that it comprises a helical central portion between the spring portions, which central portion is arranged so as to be concentric with respect to the pivot axis.

In this way, there is no play between the bladder and the lever portion, such that the response characteristic immediately results in pivoting of the lever portion, even in the case of low filling of the bladder. This makes it possible to achieve an evacuation time or filling time until complete evacuation or complete filling, respectively, of the at least one bladder of less than 5 seconds and more than 0 seconds. The stated time period can be different for different application cases. For a first application case of manual "static" adjustment of the sidewall, this time period is preferably approximately 3-5 seconds. For the second application case of dynamic adjustment, this time period is less than 2 seconds, preferably less than 1.5 seconds. Idle times, which could slow the active adjustment of the sidewall, are prevented thereby. The same also applies in the case of emptying, since the preload force, between the lever portion and the stationary portion, supports the bladder, by means of pressure thereon, during evacuation.

As described above, the preload should also exist if the stationary portion and the lever portion rest more or less directly on one another. For this purpose, the preload of the torsion spring pushes the first wind portion in the direction of the stationary portion, when the at least one fluid-fillable bladder is completely evacuated.

The invention further relates to a motor vehicle seat system. This comprises the above-described motor vehicle seat, at least one valve means designed for filling or emptying the bladder, and a controller. The controller generates a control signal in order to bring about opening or closing of the valve means. This control signal can for example be generated in that it is identified, in a motor vehicle, whether a steering procedure is introduced at the steering wheel, which indicates that the vehicle is approaching a corner. Alternatively or in addition, for example an acceleration sensor may also be part of the motor vehicle seat system according to the invention, which sensor for example identifies accelerations perpendicular to the direction of travel. Steering movements or lateral accelerations can thus be detected and forwarded to the controller, which thereupon generates a control signal in order to activate the adjustment mechanism. In the case according to the invention, this means that the fluid-fillable bladder is filled on the side on which support of the vehicle occupant is required. As a result generating a control signal of this kind, the associated opening of the valve means, and, consequently the filling or emptying of the bladder, according to the invention the lever portion is movable along a predetermined pivot path, for example between a fist end position and a second end position. In this case, movable primarily means pivotable. Of course, a pure pivot movement does not have to be carried out; it is possible for the pivot axis to in turn also perform translational movements.

For the effectiveness of active support by the sidewall, it comes down to how quickly the lever portion can cover its pivot path between the two end positions. This is determined on the one hand by the time required for filling the bladder, and on the other hand by the reaction time of the motor vehicle seat system. The reaction time can preferably be defined as the time period between the time of the control signal being generated by the controller for opening the valve means, or the time point of the actual opening of the valve means, and the time at which the lever portion has covered 50% or less, preferably 30% or less, of the pivot path. Said reaction time is preferably more than 0 seconds, and in this case less than 2 seconds, preferably less than 1.6 seconds, extremely preferably less than 1.3 seconds.

The motor vehicle seat system according to the invention makes it possible to achieve cost-effective active support of the vehicle occupant by sidewalls, by means of a more or less purely mechanical solution, without significant outlay for apparatus.

BRIEF DESCRIPTION OF THE DRAWINGS

The invention will be explained in greater detail in the following, with reference to the embodiment shown in FIGS. 1-3.

DETAILED DESCRIPTION OF PREFERRED EMBODIMENTS

Figure 1:
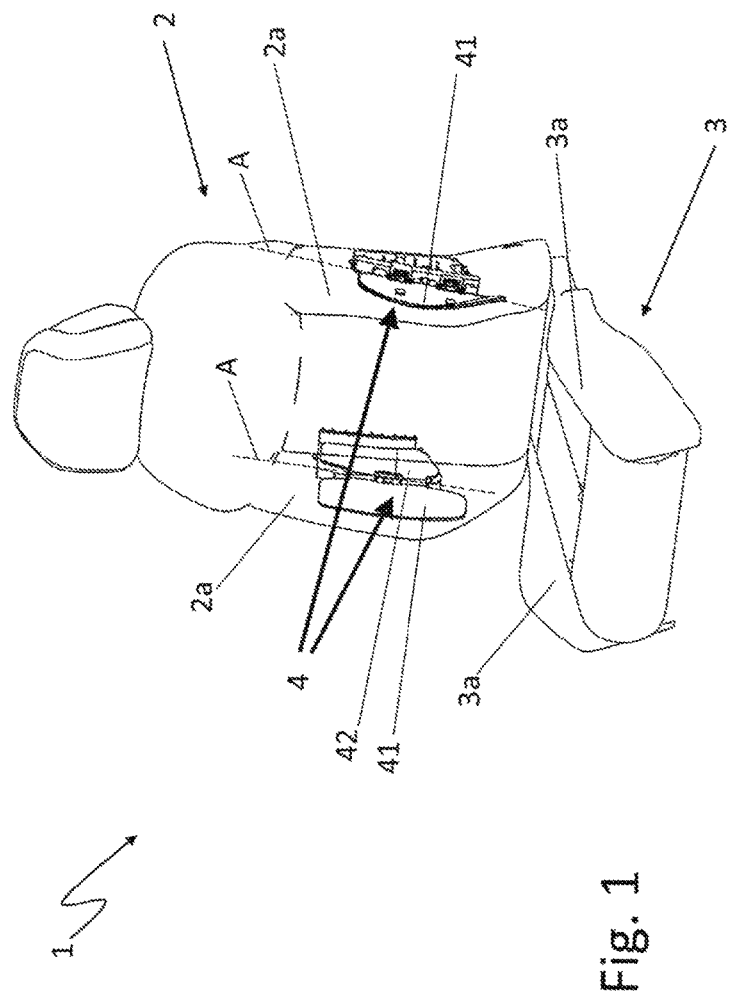
FIG. 1 is a perspective view of a motor vehicle seat according to the invention.

An example for a motor vehicle seat 1 according to the invention is shown in FIG. 1. Said seat comprises a backrest 2 and a seat part 3. The seat part 3 has two sidewalls 3a, just as the backrest 2 comprises sidewalls 2a. In the example shown, the sidewalls 2a of the backrest 2 have an adjustment mechanism 4, by means of which it they can be actively adjusted. Although such an adjustment possibility for the sidewalls 3a of the seat part 3 is not shown, seats are also conceivable in which both the sidewalls 2a of the backrest 2 and the sidewalls 3a of the seat part 3 can be adjusted by means of an adjustment mechanism 4. In the same way, adjustable sidewalls may be provided merely in the region of the seat part 3. The adjustment mechanism 4 of the sidewalls 2a is indicated by a lever portion 41, 42. Said lever portion 41, 42 is located under the seat cover or also under corresponding upholstery of the sidewall 2a, and is arranged so as to be pivotable about a pivot axis A, relative to the backrest 2, more precisely relative to a stationary portion fastened to the structure of the backrest 2. Pivoting of the lever portion 41, 42, in particular of the front wing portion 41 in the drawing, here, about the pivot axis A, causes the relevant sidewall to pivot in the direction of the center of the backrest 2 or in the opposite direction.

Figure 2:
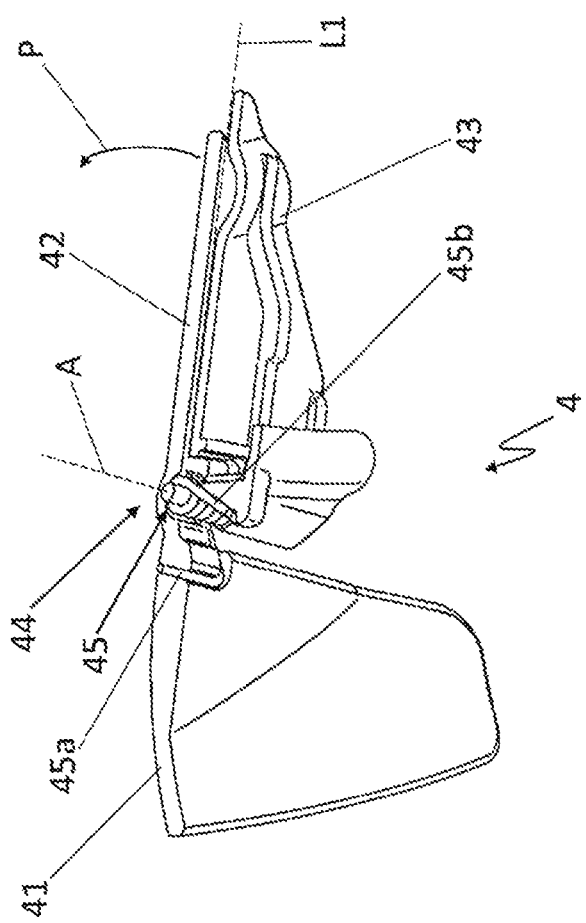
FIG. 2 shows the interior of a sidewall according to the invention, comprising an adjustment mechanism in a first angular position between the stationary portion and the lever portion.

According to the invention, the stated pivot movement about the axis A is caused by a fluid-fillable bladder being filled with or evacuated of a fluid, preferably air, by means of a controller and a valve means, in response to a control signal. This is shown in FIGS. 2 and 3.

The adjustment mechanism 4 is shown there. FIG. 2 shows an end position in which the fluid-fillable bladder is completely evacuated. FIG. 3 is a view which shows a partially filled (intermediate position) or completely filled bladder 5 (end position). The part of the motor vehicle seat system which is connected to the fluid-fillable bladder 5 and brings about the filling or evacuation is not shown, for the sake of clarity.

The adjustment mechanism 4 according to the invention first comprises a stationary portion 43 which is connected to the structure of the motor vehicle seat and is consequently oriented along a fixed line L1. A lever portion 41, 42 is hingedly connected to said stationary portion 43, in particular so as to be pivotable about a rotary joint 44 and the pivot axis A. Said lever portion comprises a first wing portion 42 which is arranged on a side of the pivot axis A. The fluid-fillable bladder 5 is arranged between said first wing portion 42 and the stationary portion 43. The second wing portion 41 of the lever portion 41, 42 is arranged on the corresponding other side of the pivot axis A. The seat cover and a portion of the upholstery of the motor vehicle seat are tensioned thereby, and thus form the profiled sidewall. The adjustment mechanism 4 further comprises a torsion spring 45, preferably designed as a leg spring, which, in the example shown, comprises two spring portions in the form of spring legs 45a and 45b, and a helical portion located between the spring legs 45a and 45b. A first spring leg 45b rests on the stationary portion 43 or is connected thereto. The second spring leg 45a rests on the lever portion 41, 42, preferably on the second wing portion 41, or is connected thereto. In the embodiment shown, the second spring leg 45a rests on the side of the second wing portion 41 facing the stationary portion 43, preferably in a depression, provided therefor, in the wing portion 41, or is connected thereto. Likewise, the first spring leg 45b rests on or is connected to an arm portion of the stationary portion 43, which is preferably perpendicular to the line L1. In the event of filling of the fluid-fillable bladder between the portions 42 and 43, then the wing portion 42 moves in the direction of the arrow P about the axis A. As a result, the second wing portion 41 is pivoted in the same direction of rotation. In this case, the two spring legs 45a and 45b are moved towards one another, such that a stress builds up in the helical portion. According to the invention, the leg spring 45 is coupled to the lever portion 41, 42 or to the stationary portion 45 such that, in the case of the end position shown in FIG. 2, when the bladder is completely empty, the first wing portion 42 is pressed against the stationary portion 43.

Figure 3:
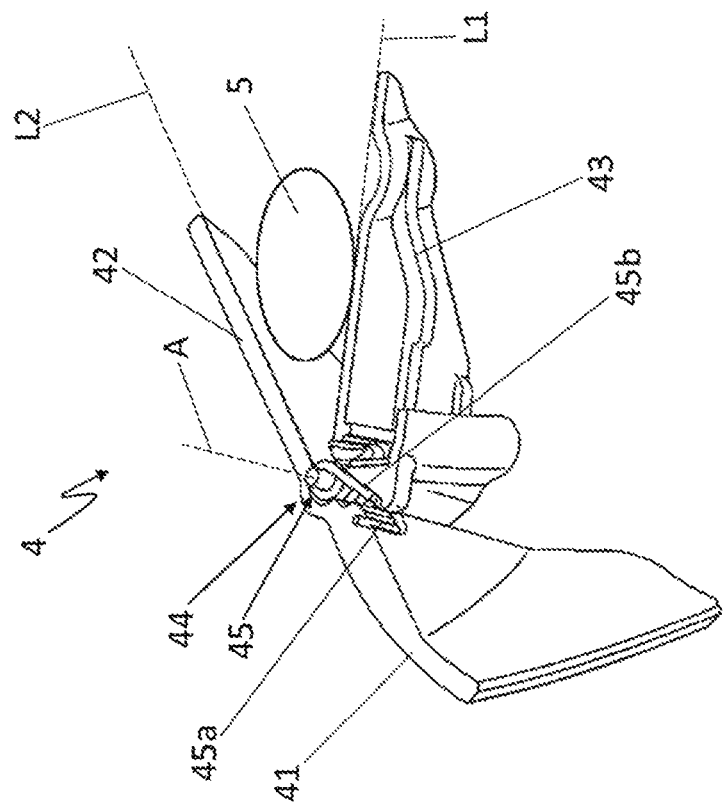
FIG. 3 shows the interior of a sidewall according to the invention, comprising an adjustment mechanism in a second angular position between the stationary portion and the lever portion.

If the bladder 5 is filled, as is shown in FIG. 3, the preload of the leg spring 45 increases, and an angle is established between the stationary portion 43 and the first wing portion 42 of the lever portion 41, 42, as is indicated by the lines L1 and L2. With successive filling of the bladder 5, the preload within the leg spring 45 also increases. This preload of the leg spring 45 means that no play arises between the portions 42 and 43, during filling, such that every volume change of the fluid-fillable bladder directly leads to a change in the angle of the lines L1 and L2. Vice versa, the increasing preload ensures, in the case of larger angles between L1 and L2, that, in the event of an evacuation of the bladder 5, said preload force presses on the bladder and assists, and thus accelerates, the evacuation process.

This arrangement therefore makes it possible to accelerate the filling process and the evacuation process, and thus achieve a faster response characteristic of the active sidewall adjustment. Furthermore, the shorter response times also make it possible for the reaction time of the motor vehicle seat system to be increased, such that the vehicle occupant senses the active support by the sidewall more quickly than compared with other solutions of the prior art. Thus, overall, the motor vehicle seat system according to the invention, and the motor vehicle seat according to the invention, are capable of increasing the dynamics of the active support of the vehicle occupant by the sidewalls.

What is claimed is:

1. A motor vehicle seat (1) comprising a backrest (2) and a seat part (3), wherein at least one adjustable sidewall (2a; 3a) is arranged on the backrest (2) and/or the seat part (3), which sidewall comprises:
   an adjustment mechanism (4) having a stationary portion (43) and a lever portion comprising two wing portions (41, 42), the lever portion (41, 42) being connected to the stationary portion (43) and is pivotable about a pivot axis (A), and having at least one fluid-fillable bladder (5) which is arranged between the stationary portion (43) and the lever portion (41, 42) for the purpose of adjusting the relative angular position thereof; and
   a torsion spring (45), wherein the torsion spring (45) is a leg spring having a first spring portion (45b) as a first spring leg and a second spring portion (45a) as a second spring leg, wherein the second spring portion (45a) is supported on the second wing portion (41) of the lever portion (41, 42), on the side facing the stationary portion (43),
   wherein the two wing portions (41, 42) are arranged on either side of the pivot axis (A), and the bladder (5) is arranged between a first wing portion (42) and the stationary portion (43),
   wherein the torsion spring (45) engages by the first spring portion (45b) on the stationary portion (43), and engages by the second spring portion (45a) on the second wing portion (41), of the lever portion (41, 42), such that it exerts a preload pushing force on the first wing portion (42) which pushes the first spring portion (42) in a direction towards the stationary portion (43).

2. The motor vehicle seat (1) according to claim 1, wherein the torsion spring (45) comprises a helical central portion between the spring portions (45a, 45b), which central portion is arranged so as to be concentric with respect to the pivot axis.

3. The motor vehicle seat (1) according to claim 1, wherein the torsion spring (45) is preloaded, and the preload of the torsion spring (45) pushes the first wing portion (42) in the direction of the stationary portion (43), when the at least one fluid-fillable bladder (5) is completely evacuated.

4. The motor vehicle seat (1) according to claim 3, wherein the evacuation time and/or the filling time until the at least one bladder (5) is completely evacuated or completely filled is less than 5 seconds and more than 0 seconds.

5. A motor vehicle seat system, comprising a motor vehicle seat (1) according to claim 1, at least one valve means designed for filling or emptying the bladder (5), and a controller which generates a control signal in order to bring about the opening or closing of the valve means, wherein the lever portion (41, 42) can be moved along a pivot path, by generating the control signal, and consequently by filling or emptying the bladder (5).

6. The motor vehicle seat system according to claim 5, wherein the reaction time, between the time of generation of the control signal by the controller for opening the valve means, or the time of actual opening of the valve means, and the time at which the lever portion (41, 42) has covered less than 50%, preferably 30%, of the pivot path, is more than 0 seconds and less than 2 seconds, preferably less than 1.6 seconds, preferably less than 1.3 seconds.

* * * * *